US010343675B2

(12) United States Patent
Hata et al.

(10) Patent No.: US 10,343,675 B2
(45) Date of Patent: Jul. 9, 2019

(54) VEHICLE CONTROL SYSTEM

(71) Applicant: TOYOTA JIDOSHA KABUSHIKI KAISHA, Toyota-shi, Aichi-ken (JP)

(72) Inventors: Kensei Hata, Shizuoka-ken (JP); Yasuhiro Oshiumi, Gotemba (JP); Takahito Endo, Shizuoka-ken (JP); Yasuyuki Kato, Numazu (JP); Yushi Seki, Susono (JP); Katsuya Iwazaki, Susono (JP); Akira Murakami, Gotemba (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 23 days.

(21) Appl. No.: 15/685,692

(22) Filed: Aug. 24, 2017

(65) Prior Publication Data
US 2018/0056978 A1 Mar. 1, 2018

(30) Foreign Application Priority Data

Aug. 26, 2016 (JP) .................................. 2016-165264

(51) Int. Cl.
*B60W 20/17* (2016.01)
*B60W 10/06* (2006.01)
(Continued)

(52) U.S. Cl.
CPC ............ *B60W 20/17* (2016.01); *B60W 10/06* (2013.01); *B60W 10/08* (2013.01); *F02D 41/021* (2013.01); *F02D 41/1498* (2013.01); *B60W 2520/10* (2013.01); *B60W 2520/105* (2013.01); *B60W 2710/0644* (2013.01);
(Continued)

(58) Field of Classification Search
CPC ...... B60W 20/17; B60W 10/08; B60W 10/06; B60W 2520/10; B60W 2710/083; B60W 2710/0666; B60W 2710/0644; B60W 2520/105; F02D 41/021; F02D 41/1498; F02D 11/105; F02D 2200/702; F02D 2200/701; F02D 2200/60; F02D 2200/501; F02D 41/0215; F02D 41/12; B60Y 2200/92; B60Y 2306/09; Y10S 903/93

See application file for complete search history.

(56) References Cited

U.S. PATENT DOCUMENTS 9,827,989 B1\* 11/2017 Saxman ................ B60W 30/20
2016/0328976 A1\* 11/2016 Jo ......................... F02D 41/403

FOREIGN PATENT DOCUMENTS

| JP | 2001001787 A | 1/2001 |
| JP | 2014088094 A | 5/2014 |
| JP | 2014-106854 A | 6/2014 |

\* cited by examiner

*Primary Examiner* — Rodney A Butler
(74) *Attorney, Agent, or Firm* — Hunton Andrews Kurth LLP

(57) ABSTRACT

A vehicle control system to operate a vehicle autonomously with improved energy efficiency and ride quality is provided. A controller is configured to set a limit value of an operating point of an engine to reduce noises and vibrations. The operating point of the engine is restricted by the limit value within an acceptable region where an engine speed is higher than the limit value but an engine torque is lower than the limit value. The limit value is set to a first limit value when the vehicle is operated autonomously while carrying the passenger, and to a second limit value to expand the acceptable region when the vehicle is operated autonomously without carrying the passenger.

5 Claims, 12 Drawing Sheets

(51) Int. Cl.
  *B60W 10/08*      (2006.01)
  *F02D 41/14*      (2006.01)
  *F02D 41/02*      (2006.01)
  *F02D 41/12*      (2006.01)
  *F02D 11/10*      (2006.01)

(52) U.S. Cl.
  CPC .............. *B60W 2710/0666* (2013.01); *B60W 2710/083* (2013.01); *B60Y 2200/92* (2013.01); *B60Y 2306/09* (2013.01); *F02D 11/105* (2013.01); *F02D 41/0215* (2013.01); *F02D 41/12* (2013.01); *F02D 2200/501* (2013.01); *F02D 2200/60* (2013.01); *F02D 2200/701* (2013.01); *F02D 2200/702* (2013.01); *Y10S 903/93* (2013.01)

US 10,343,675 B2

VEHICLE CONTROL SYSTEM

CROSS REFERENCE TO RELATED APPLICATIONS

The present invention claims the benefit of priority to Japanese Patent Application No. 2016-165264 filed on Aug. 26, 2016 with the Japanese Patent Office, the entire contents of which are incorporated herein by reference in its entirety.

BACKGROUND

Field of the Invention

Embodiments of the present application relate to the art of a vehicle control system configured to operate a vehicle autonomously.

Discussion of the Related Art

JP-A-2014-106854 describes an automatic driving vehicle control apparatus includes: detection means for acquiring at least any of vehicle traveling state, vehicle surrounding state, and driver state; automatic driving means for automatically driving a vehicle; and determination means for determining whether a condition for automatic driving is satisfied or not. According to the teachings of JP-A-2014-106854, the determination means determines that the automatic driving condition is not satisfied when detection accuracy of the detection means does not satisfy a predetermined criterion. When the determination means determines that the automatic driving condition is satisfied, the vehicle is started the automatic driving. By contrast, when the determination means determines that the automatic driving condition is not satisfied during automatic driving, a warning is given to a driver to cancel the automatic driving. The automatic driving vehicle control apparatus taught by JP-A-2014-106854 is further configured to periodically calculate a stop spot where the vehicle can be safely stopped based on the vehicle surrounding state and the vehicle traveling stat, and to guide the vehicle to the stop spot when the driver does not cancel the automatic driving against the warning to cancel the automatic driving.

The vehicle to which the control apparatus taught by JP-A-2014-106854 is applied may be operated not only manually by a driver but also autonomously, with or without the driver or a passenger.

In a vehicle having a gasoline engine or a diesel engine, noises and vibrations are caused inevitably during operation of the engine and this may reduce ride comfort in comparison with the electric mode. According to the prior art, therefore, a limit value of an engine torque or power is set to reduce the noises and vibrations of the engine. For example, an operating region of the engine is restricted in such a manner that an engine speed is restricted lower than the limit value but an engine torque is restricted higher than the limit value. Such restriction of an operating point of the engine is executed not only in the vehicles propelled by the engine but also in hybrid vehicles propelled by the engine and a motor.

When the vehicles operated autonomously e.g., by the control apparatus of JP-A-2014406854 while carrying a passenger, ride comfort may be improved by restricting the operating point of the engine to reduce the noises and vibrations of the engine. However, the engine may not be operated in an optimally fuel efficient manner if the operating point is restricted. That is, if the operating point of the engine is restricted in a steady pattern, an energy efficiency of the engine may be reduced especially when propelling the vehicle autonomously without carrying the passenger.

SUMMARY

Aspects of embodiments of the present disclosure have been conceived noting the foregoing technical problems, and it is therefore an object of the present disclosure is to provide a vehicle control system configured to operate a vehicle autonomously with improved energy efficiency and ride quality.

The vehicle control system according to the embodiments of the present disclosure is applied to a vehicle powered at least by an engine to operate the vehicle autonomously. The vehicle control system comprises a controller that is configured to: set a limit value of an operating point of the engine to reduce noises and vibrations of the engine; restrict the operating point of the engine by the limit value, within an acceptable region where an engine speed is higher than the limit value but an engine torque is lower than the limit value; determine a presence of a passenger in a vehicle compartment; set the limit value to a first limit value in a case that the vehicle is operated autonomously while carrying the passenger; and set the limit value to a second limit value to expand the acceptable region of the operating point of the engine in a case that the vehicle is operated autonomously without carrying the passenger.

In a non-limiting embodiment, the vehicle may comprise a motor serving as a prime mover. In addition, the controller may be further configured to generate torque by the motor in a case that the limit value is set to the second limit value.

In a non-limiting embodiment, the vehicle may comprise a sensor that detects a vehicle speed. In addition, the controller may be further configured to shift the limit value from the second limit value to a third limit value to narrow the acceptable region of the operating point of the engine in a case that the vehicle speed is equal to or lower than a threshold value.

In a non-limiting embodiment, the vehicle may comprise a sensor that detects a pedestrian around the vehicle. In addition, the controller may be further configured to shift the limit value from the second limit value to a third limit value to narrow the acceptable region of the operating point of the engine in a case that the pedestrian is detected by the sensor within a predetermined area around the vehicle.

In a non-limiting embodiment, the vehicle may comprises a device that is arranged in the vehicle compartment. In addition, the controller may be further configured to determine a presence of the passenger based on at least any one of an operating state and an activating state of the device.

In a non-limiting embodiment, the controller may be further configured to: determine that the vehicle is stopping; and set the limit value to the first limit value in a case that the vehicle is stopping.

Thus, according to the embodiments of the present disclosure, the controller restricts the acceptable region of the operating point of the engine to reduce noises and vibrations of the engine when the vehicle is operated autonomously while carrying the passenger. For this reason, ride quality of the vehicle may be improved. By contrast, when the vehicle is operated autonomously without carrying the passenger, the controller widens the acceptable region of the operating point of the engine to operate the engine in an optimally fuel efficient manner. For this reason, fuel efficiency of the vehicle may be improved.

In addition, when the vehicle is operated autonomously without carrying the passenger, the motor is operated to generate torque to reduce collision noise and rattling noise at meshing portions of a gear pair and a splined coupling. For this reason, ride quality of the vehicle may be further improved while limiting damages on the gears and splines.

As described, when the vehicle is propelled autonomously without carrying a passenger at an extremely low speed, the acceptable region of the operating point of the engine is also narrowed to restrict operating point of the engine. For this reason, noises and vibrations of the engine will not bother pedestrians around the vehicle when the vehicle propels at an extremely low speed.

The acceptable region of the operating point of the engine is also narrowed to restrict the operating point of the engine when the sensor detects a pedestrian while propelling the vehicle autonomously without carrying a passenger. In this case, the pedestrians around the vehicle may also be prevented from the noises and vibrations of the engine.

In addition, a presence of the passenger in the vehicle compartment may be determined easily based on an operation or activation of the existing devices arranged in the vehicle compartment.

Further, the acceptable region of the operating point of the engine is also narrowed to restrict operating point of the engine when the vehicle stops. In this case, the pedestrians around the vehicle may also be prevented from the noises and vibrations of the engine.

BRIEF DESCRIPTION OF THE DRAWINGS

Features, aspects, and advantages of exemplary embodiments of the present invention will become better understood with reference to the following description and accompanying drawings, which should not limit the invention in any way.

DETAILED DESCRIPTION OF THE PREFERRED EMBODIMENT(S)

Preferred embodiments of the present application will now be explained with reference to the accompanying drawings.

Figure 1:
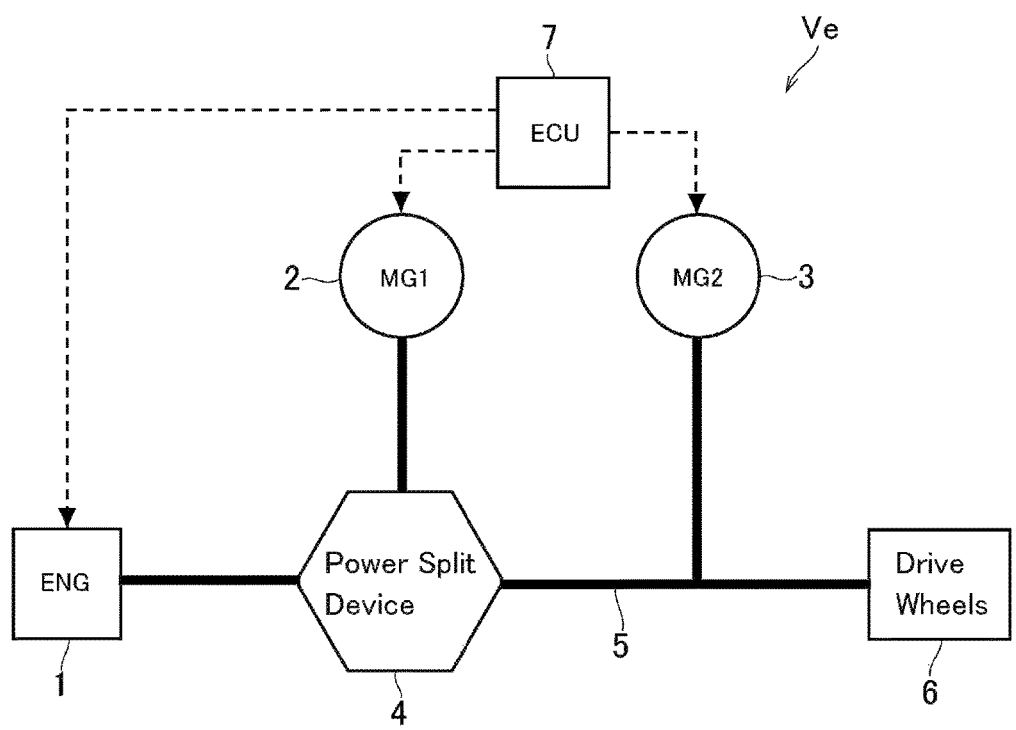
FIG. 1 is a schematic illustration showing a first example of a drive system of the hybrid vehicle.

Referring now to FIG. 1, there is schematically shown a first example of a drive system of the hybrid vehicle Ve. As shown in FIG. 1, a prime mover of a vehicle Ve includes an engine (referred to as "ENG" in FIG. 1) 1, a first motor 2 (referred to as "MG1" in FIG. 1) and a second motor (referred to as "MG2" in FIG. 1) 3. The vehicle Ve comprises a power split device 4, an output member 5, drive wheels 6, and a controller 7.

Specifically, an internal combustion engine such as a gasoline engine and a diesel engine may be used as the engine 1. An output power of the engine 1 may be adjusted electrically, and the engine 1 may be started and stopped electrically according to need. For example, given that the gasoline engine is used as the engine 1, an opening degree of a throttle valve, an amount of fuel supply, a commencement and a termination of ignition, an ignition timing etc. may be controlled automatically. As described later with reference to FIG. 3, in order to reduce noises and vibrations of the engine 1, an operating point of the engine 1 is restricted within an acceptable range by a restriction value (or a restriction line).

A permanent magnet type synchronous motor or an induction motor having a generating function, that is, a motor-generator may be used individually as the first motor 2 and the second motor 3. The first motor 2 and the second motor 3 are connected to each other through a battery and an inverter (neither of which are shown) so that rotational speeds and torques thereof can be controlled responsive to a current applied thereto, and hence those motor 2 and 3 can be operated selectively as a motor and a generator. In the vehicle Ve shown in FIG. 1, therefore, an electric power generated by the first motor 2 can be supplied to the second motor 3 to generate torque, and the torque of the second motor 3 can be applied to drive wheels 6 to propel the vehicle Ve.

The power split device 4 is a planetary gear unit comprising an input element, a reaction element and an output element. In the power split device 4, the input element is connected to the engine 1, the reaction element is connected to the first motor 2, and the output element is connected to the drive wheels 6 through an output member 5. In the vehicle Ve, an output torque of the engine 1 is distributed to the first motor 2 and to the drive wheels 6 through the power split device 4, and an output torque of the first motor 2 is delivered not only to the drive wheels 6 but also to the engine 1 to start the engine 1.

In the vehicle Ve, not only front wheels but also rear wheels may serve as the drive wheels 6. Alternatively, all of the front and rear wheels may be rotated to serve as the drive wheels 6. Each of the front wheels and rear wheels is individually provided with a brake device (not shown), and any one of the pairs of the front wheels and the rear wheels is connected to a steering device (not shown).

In order to electrically control the vehicle Ve, the vehicle Ve is provided with a controller (referred to as "ECU" in FIG. 1) 7 as an electronic control unit composed mainly of a microcomputer. For example, detection signals and information from an after-mentioned external sensor 11, a GPS receiver 12, an internal sensor 13, a map database 14, a navigation system 15 and so on are sent to the controller 7. The controller 7 may be configured to communicate with an inter-vehicle communication system to exchange data therebetween. Specifically, the controller 7 is configured to carry out a calculation based on incident data as well as data and formulas installed in advance, and to transmit calculation results in the form of command signals to the above-mentioned elements and after-mentioned actuators and auxiliaries.

An operating mode the vehicle Ve may be selected from a hybrid mode (to be abbreviated as the "HV mode" hereinafter) in which the vehicle Ve is powered at least by the engine 1, and an electric vehicle mode (to be abbreviated as the "EV mode" hereinafter) in which the vehicle Ve is powered by at least one of the first motor 2 and the second motor 3 while stopping the engine 1. The HV mode may be selected from a first HV mode in which the vehicle Ve is powered only by the engine 1, a second HV mode in which the vehicle Ve is powered by the engine 1 and at least one of the first motor 2 and the second motor 3, and a third HV mode in which the vehicle Ve is powered by the engine 1 while operating one of the motors 2 and 3 by the engine 1. On the other hand, the EV mode may be selected from a single-motor mode in which the vehicle Ve is powered only by the second motor 3, and a dual-motor mode in which the vehicle Ve is powered by both of the first motor 2 and the second motor 3.

The control system according to the embodiments of the present disclosure is configured to operate the vehicle Ve autonomously. Specifically, the control system is configured to execute a starting operation, an accelerating operation, a steering operation, a braking operation, a stopping operation and etc. of the vehicle Ve completely autonomously at the level 4 defined by the NHTSA (National Highway Traffic Safety Administration) or the level 4 or 5 defined by the SAE (Society of Automotive Engineers), while recognizing and observing an external condition and a travelling condition. For this reason, the vehicle Ve may be operated not only autonomously with or without a driver (and a passenger) but also manually by the driver.

Figure 2:
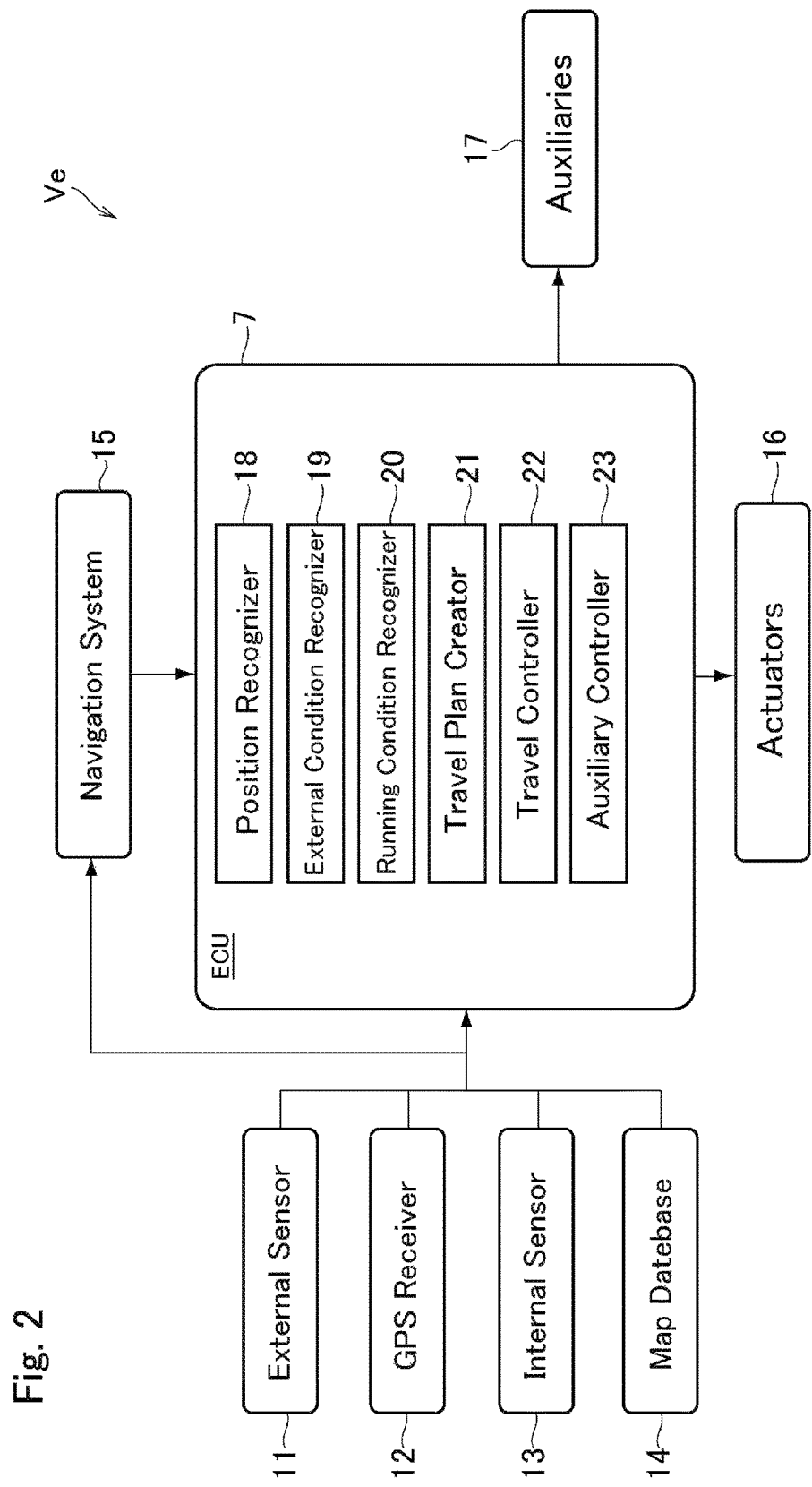
FIG. 2 is a schematic illustration showing a control system of the hybrid vehicle according to the embodiment of the present disclosure.

Configuration of the control 7 is shown in FIG. 2 in more detail. As shown in FIG. 2, detection signals and information from the external sensor 11, the GPS receiver 12, the internal sensor 13, the map database 14, the navigation system 15 and so on are sent to the controller 7. Although only one controller 7 is depicted in FIG. 2, a plurality of controllers may be arranged in the vehicle Ve to control the above-mentioned devices individually.

The external sensor 11 includes at least one of the following external sensors for detecting an external condition, such as an on-board camera, a RADAR (i.e., a radio detection and ranging) a LIDAR (i.e., a laser imaging detection and ranging), an ultrasonic sensor and so on.

Specifically, the on-board camera is arranged e.g., in a front part and both sides of the vehicle Ve, and transmits recorded information about the external condition to the controller 7. To this end, not only a monocular camera but also a stereo camera having a plurality of lenses and image sensors to achieve a binocular vision may be used as the on-board camera. If the stereo camera is used as the on-board camera, the controller 7 is allowed to obtain three-dimensional information of the recorded object.

The RADAR is adapted to detect obstacles utilizing radio waves such as millimetric-waves and microwaves, and to transmit detected information to the controller 7. Specifically, the RADAR detects an obstacle such as other vehicles and so on by emitting radio waves and analyzing the radio waves reflected from the obstacle.

The LIDAR (or a laser sensor and a laser scanner) is adapted to detect obstacles utilizing laser light and to transmit detected information to the controller 7. Specifically, the LIDAR detects an obstacle such as other vehicles and so on by emitting laser light and analyzing the laser light reflected from the obstacle.

The ultrasonic sensor is adapted to detect obstacles utilizing ultrasonic and to transmit detected information to the controller 7. Specifically, the ultrasonic sensor detects an obstacle such as other vehicles and so on by emitting ultrasonic and analyzing the ultrasonic reflected from the obstacle.

The GPS receiver is adapted to obtain a position (i.e., latitude and longitude) of the vehicle Ve based on incident signals from GPS satellites, and to transmit the positional information to the controller 7.

The internal sensor 13 is adapted to detect operating conditions and behaviors of the constituent elements of the vehicle Ve. Specifically, the internal sensor 13 includes a vehicle speed sensor for detecting a speed of the vehicle Ve, an engine speed sensor for detecting a speed of the engine 1, a motor speed sensor (or a resolver) for detecting speeds of the motors 2 and 3, a throttle opening sensor for detecting an opening degree of a throttle valve, a throttle sensor for detecting an opening degree of an accelerator, a brake sensor (or switch) for detecting a depression of a brake pedal, an accelerator sensor for detecting a position of an accelerator pedal, a steering sensor for detecting a steering angle of the steering device, a longitudinal acceleration sensor for detecting a longitudinal acceleration of the vehicle Ve, a lateral acceleration sensor for detecting a lateral acceleration of the vehicle Ve, a yaw rate sensor for detecting a yaw rate of the vehicle Ve, a battery sensor for detecting a state of charge (to be abbreviated as the "SOC" hereinafter) level of a battery connected to the motors 2 and 3, a seat sensor for detecting an occupant sitting on a vehicle seat, a seatbelt sensor for detecting a fastening of a seatbelt, a biometric passenger sensor or a motion sensor for detecting a driver or passenger sitting on the vehicle seat.

The map database 14 may be installed in the controller 7, but map information stored in external online information processing systems may also be available.

The navigation system 15 is configured to determine a travelling route of the vehicle Ve based on the positional information obtained by the GPS receiver and the map database 14.

The controller 7 carries out calculations based on the incident data or information from the external sensor 11, the GPS receiver 12, the internal sensor 13, the map database 14 and the navigation system 15, and calculation results are sent in the form of command signal to the actuators 16 of the elements to be actuated to operate the vehicle Ve autonomously and the auxiliaries 17.

The actuators 16 include a throttle actuator, a brake actuator, a steering actuator and so on, and the vehicle Ve may be operated autonomously by manipulating the actuators 16.

Specifically, the throttle actuator changes an opening degree of the throttle valve of the engine 1 to generate a required power in accordance with the control signal transmitted from the controller 7. The brake actuator controls the brake device to generate a required braking force applied to the vehicle Ve in accordance with the control signal transmitted from the controller 7. The steering actuator actuates an assist motor of an electric power steering device to turn the vehicle Ve in accordance with the control signal transmitted from the controller 7.

The auxiliaries 17 include devices that are not involved in propulsion of the vehicle Ve such as a wiper, a headlight, a direction indicator, an air conditioner, an audio player and so on.

The controller 7 includes a position recognizer 18, an external condition recognizer 19, a running condition recognizer 20, a travel plan creator 21, a travel controller 22, an auxiliary controller 23 and so on.

The position recognizer 18 is configured to recognize a current position of the vehicle Ve on a map based on positional information received by the GPS receiver 12 and the map database 14. The current position of the vehicle Ve may also be obtained from the positional information used in the navigation system 15. Optionally, the vehicle Ve may also be adapted to communicate with external sensors and signposts arranged along the road to obtain the current position of the vehicle Ve.

The external condition recognizer 19 is configured to recognize external condition of the vehicle Ve such as a location of a traffic lane, a road width, a road configuration, a road gradient, an existence of obstacles around the vehicle Ve and so on, based on the recorded information of the on-board camera, or detection data of the RADAR or the LIDAR. Optionally, weather information, a friction coefficient of road surface etc. may be obtained according to need.

The running condition recognizer 20 is configured to recognize running condition of the vehicle Ve such as a vehicle speed, a longitudinal acceleration, a lateral acceleration, a yaw rate and so on based on detection result of the internal sensors 13.

The travel plan creator 21 is configured to create a travel locus of the vehicle Ve based on a target course determined by the navigation system 15, a position of the vehicle Ve recognized by the position recognizer 18, and an external condition recognized by the external condition recognizer 19. That is, the travel plan creator 21 creates a travel locus of the vehicle Ve within the target course in such a manner that the vehicle Ve is allowed to travel safely and properly while complying traffic rules. In addition, the travel plan creator 21 is further configured to create a travel plan in line with the travel locus and the target course created based on the recognized external conditions and the map database 14.

Specifically, the travel plan is created based on prospective data after few seconds from the present moment to determine a future condition of the vehicle Ve such as a driving force or the like required in future. Optionally, the travel plan may also be created based on prospective data after several ten seconds depending on the external conditions and the running conditions. Thus, the travel plan creator 21 creates a future plan to change a vehicle speed, acceleration, steering torque etc. during travelling along the target course in the form of e.g., a map.

Alternatively, the travel plan creator 21 may also create a pattern to change the vehicle speed, acceleration, steering torque etc. between predetermined points on the travel locus. Specifically, such patterns may be determined by setting target values of those parameters at each point on the travel locus taking account of a required time to reach the point at the current speed.

The travel controller 22 is configured to operate the vehicle Ve autonomously in line with the travel plan created by the travel plan creator 21. To this end, specifically, the travel controller 22 transmits command signals to the throttle actuator, the brake actuator, the steering actuator, the engine 1, the first motor 2, the second motor 3 and so on in accordance with the travel plan.

The auxiliary controller 23 is configured to operate the auxiliaries 17 such as the wiper, the headlight, the direction indicator, the air conditioner, the audio player and so on in line with the travel plan created by the travel plan creator 21.

Details of autonomous operation of the vehicle in line with the travel plan are described in more detail in the publication of JP-A-2016-99713. According to the embodiments of the present disclosure, the vehicle Ve may be operated not only completely autonomously utilizing e.g., the teachings of JP-A-2016-99713.

As described, noises and vibrations are caused inevitably by a combustion of fuel, pulsations of torque etc. during operation of the engine 1. Specifically, the noises and vibrations of the engine 1 are generated due to resonance between pulsation of engine torque and natural vibrations of members connected to the engine 1. In addition, in the vehicle Ve, vibrations may also be generated from a transmission connected to the first motor 2 and the second motor 3. Especially, when the first motor 2 and the second motor 3 do not generate torques (that is, output torques are 0 or substantially 0), collision noise and rattling noise may be generated at meshing portions of a gear pair and a splined coupling. Such rattling noise and collision noise are also generated in the vehicle powered only by the engine.

Figure 3:
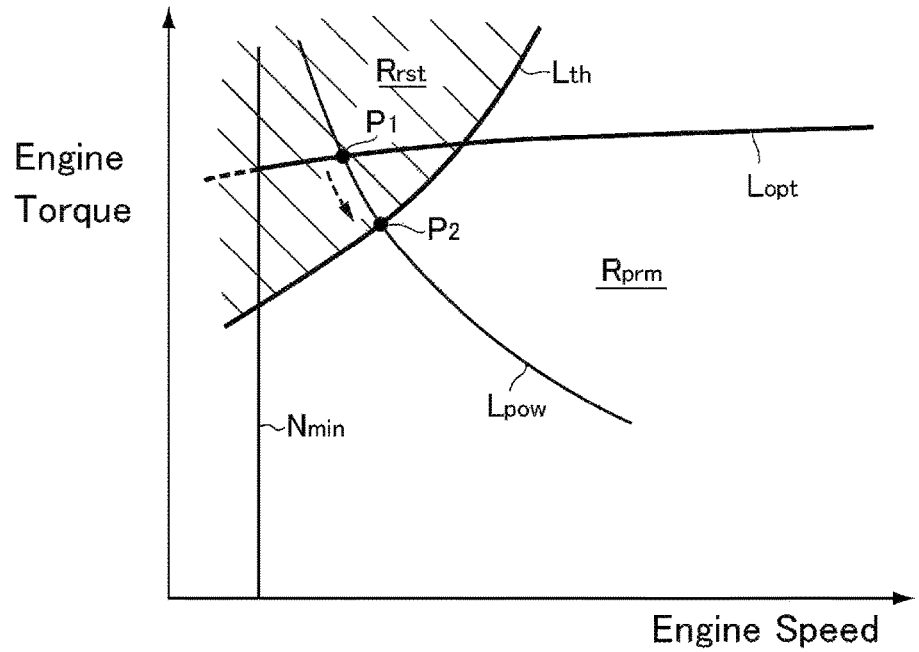
FIG. 3 is a view showing the acceptable operating region restricted by the limit line.

In order to reduce the noises and vibrations of the engine 1, the control system according to the embodiments of the present disclosure is configured to set a limit value for restricting an operation of the engine 1. Specifically, the control system sets a limit value (or a limit line Lth) as a threshold value of an operating point of the engine 1 governed by an engine speed and an engine torque so as to restrict an acceptable operating region Rrpm of the operating point of the engine 1. As shown in FIG. 3, the limit line Lth is drawn in such a manner that the operating region of the engine 1 is divided into an unacceptable region Rrst as a hatched region where the noises and vibrations of the engine 1 is expected to be generated, and the acceptable operating region Rrpm where the engine speed is higher than the limit value but the engine torque is lower than the limit value. To this end, the limit line Lth is set on the basis of a result of experimentation or simulation.

According to the embodiments of the present disclosure, therefore, the engine 1 is prevented to be operated within the unacceptable region Rrst where the engine torque is greater than the limit line Lth and the engine speed is lower than the limit line Lth.

In FIG. 3, Nmin represents a lowest engine speed line as a self-sustaining idling speed, Lopt represents an optimum fuel efficient curve, and Lpow represents one of typical equal power lines. In a normal situation, in order to improve fuel efficiency, the engine 1 is operated in such a manner as to control the operating point along the optimum fuel efficient curve Lopt while maintaining the engine speed higher than the lowest engine speed line Nmin. When the engine 1 is operated at a point within the unacceptable region Rrst, the operating point of the engine 1 is shifted to an intersection between the equal power line Lpow and the limit line Lth. For example, if the operating point of the engine 1 is set based on a current vehicle speed and a require drive force to a point P1, the operating point of the engine 1 is shifted to a point P2 on the intersection between the equal power line Lpow and the limit line Lth.

The noises and vibrations of the engine 1 may be reduced by operating the engine 1 within the restricted acceptable operating region Rrpm so as to improve ride quality of the vehicle Ve. However, as a result of thus restricting the operating point of the engine 1 to reduce the noises and vibrations of the engine 1, the engine 1 may not be operated along the optimum fuel efficient curve Lopt. By contrast, when operating the vehicle Ve autonomously, it is preferable to operating the engine 1 in an optimally fuel efficient manner rather than reducing the noises and vibrations of the engine 1.

Figure 4:
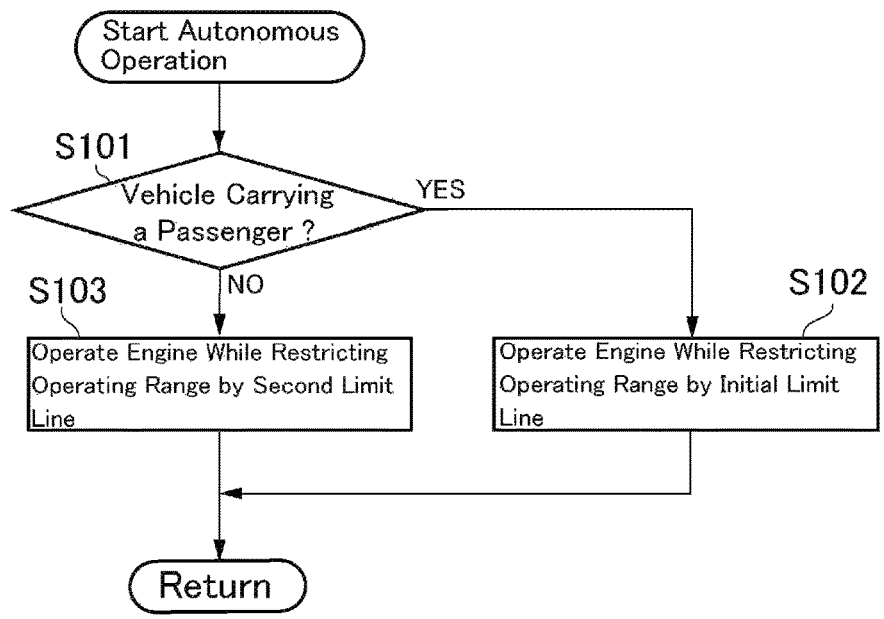
FIG. 4 is a flowchart showing a first control example executed by the control system.

The controller 7 according to the embodiments of the present disclosure is configured to properly reduce the noises and vibrations of the engine 1 and save the fuel depending on the situation. Turning to FIG. 4, there is shown a first control example executed by the controller 7 when starting an autonomous operation of the vehicle Ve. For example, if the vehicle Ve is adapted to be operated only autonomously, the routine shown in FIG. 4 is commenced when starting the vehicle Ve. By contrast, if the vehicle Ve is adapted to be operated not only autonomously but also manually, the routine shown in FIG. 4 is commenced when starting the autonomous operation of the vehicle Ve.

First of all, a presence of the passenger in a vehicle compartment is determined at step S101. Such determination at step S101 may be made based on a detection signal of a body temperature of the passenger from the biometric passenger sensor such as an infrared sensor, a detection signal of a body movement of the passenger from a motion sensor such as a doppler sensor, or a detection signal of an occupancy of the vehicle seat from the seat sensor. Alternatively, the determination at step S101 may also be made based on an operating state or activating state of the devices arranged in the vehicle compartment. In this case, a presence of the passenger may be determined based on a fact that a power switch, an ignition switch, a start button or the like is turned on.

Figure 5:
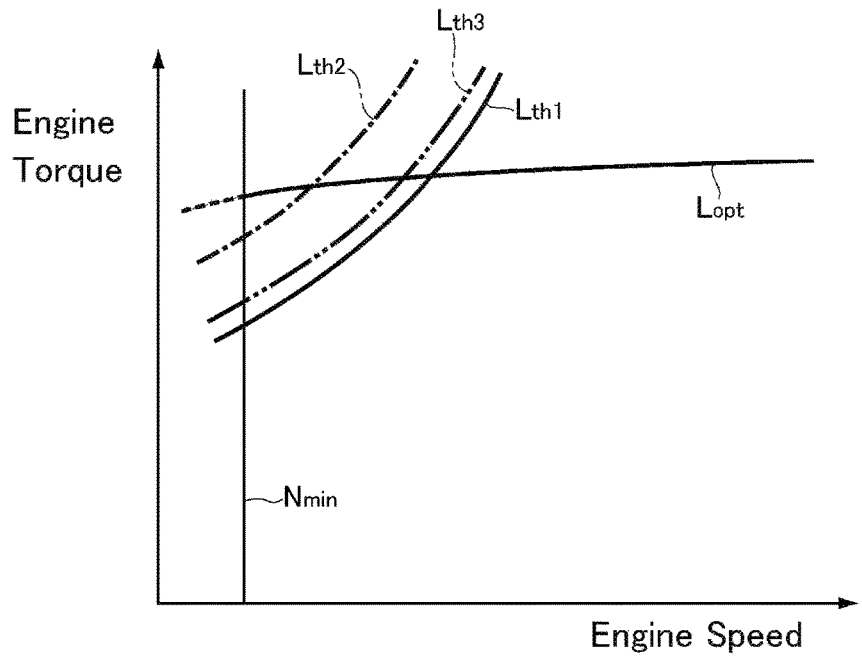
FIG. 5 is a view showing the acceptable operating region restricted by the first limit line, the second limit line and the third limit line.

If a presence of the passenger in the vehicle compartment is detected so that the answer of step S101 is YES, that is, if the vehicle Ve is propelled autonomously while carrying a passenger, the routine progresses to step S102 to operate the engine 1 while restricting the acceptable operating region Rrpm of the operating point of the engine 1 by a first limit line Lth1. As shown in FIG. 5, the limit line Lth is initially set to the first limit line Lth1, and in the case that the vehicle Ve is operated autonomously while carrying a passenger, the engine 1 is operated without altering the limit line Lth from the first limit line Lth1. Then, the routine returns.

Thus, in the case that the vehicle Ve is operated autonomously while carrying a passenger, the engine 1 is operated while restricting the acceptable operating region Rrpm of the operating point to the narrowest region by the first limit line Lth1. In this case, therefore, the engine 1 is operated in such a manner as to reduce the noises and vibrations thereby improving ride comfort.

By contrast, if a presence of the passenger in the vehicle compartment is not detected so that the answer of step S101 is NO, that is, if the vehicle Ve is propelled autonomously without carrying a passenger, the routine progresses to step S103 to shift the limit line Lth from the first limit line Lth1 to a second limit line Lth2. As shown in FIG. 5, the second limit line Lth2 is drawn in such a manner that a lower limit value of the engine speed is lower than that of the first limit line Lth1 and an upper limit value of the engine torque is higher than that of the first limit line Lth1. Consequently, the acceptable operating region Rrpm of the operating point of the engine 1 is expanded or widened. That is, restriction of operation of the engine 1 is relaxed or eased. Then, the routine returns.

Thus, in the case that the vehicle Ve is propelled autonomously without carrying a passenger, the engine 1 is operated while saving fuel to improve fuel efficiency rather than reducing the noises and vibrations.

Modification examples of the first control example are shown in FIGS. 6 to 10. In FIGS. 6 to 10 common step numbers as the routine shown in FIG. 4 are allotted to the common steps.

Figure 6:
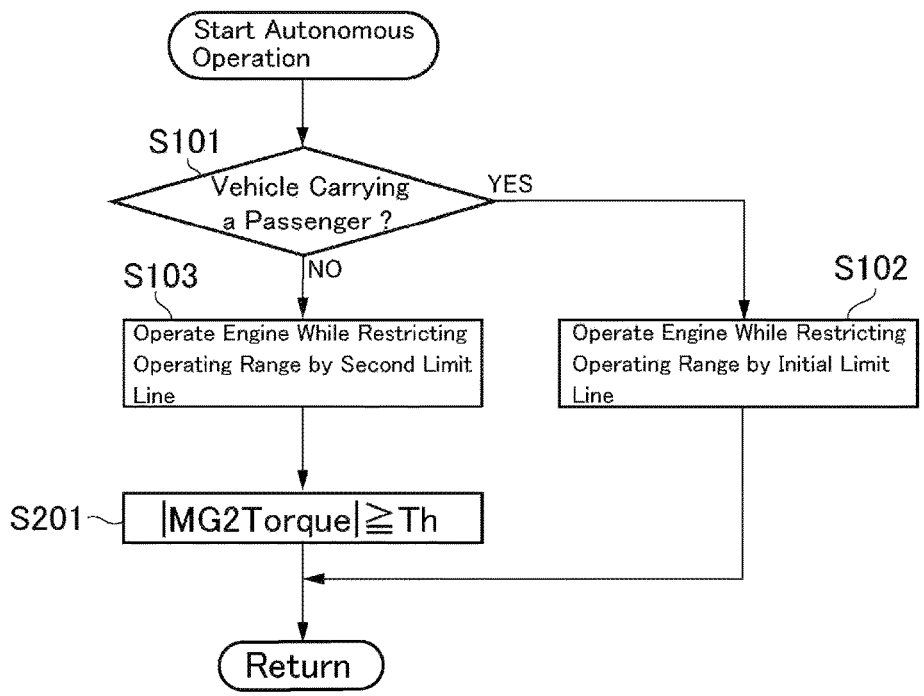
FIG. 6 is a flowchart showing a second control example executed by the control system.

FIG. 6 shows the second control example as a modification of the first control example. According to the second control example, after shifting the limit line Lth from the first limit line Lth1 to the second limit line Lth2, the routine progresses to step S201 to control the second motor 3 in such a manner as to maintain an absolute value of a torque of the second motor 3 equal to or greater than a threshold value Tth. Then, the routine returns.

As described, if the second motor 3 does not generate torque, collision noise and rattling noise may be generated at meshing portions of a gear pair and a splined coupling, and consequently the gears and splines will be subject to wear. In order to reduce such collision noise and rattling noise, the threshold value Tth of the torque of the second motor 3 is set to a level at which the collision noise and rattling noise are eliminated based on a result of experimentation or simulation. According to the second control example, therefore, the noises and vibrations of the second motor 3 is also reduced in addition to the noises and vibrations of the engine 1 so that ride comfort of the vehicle Ve is further improved while limiting damages on the gears and splines.

Optionally, the threshold value Tth may also be applied to a torque of the first motor 2. In this case, the torque of the first motor 2 is maintained higher than the threshold value Tth so that noises and vibrations of the first motor 2 is also reduced.

Figure 7:
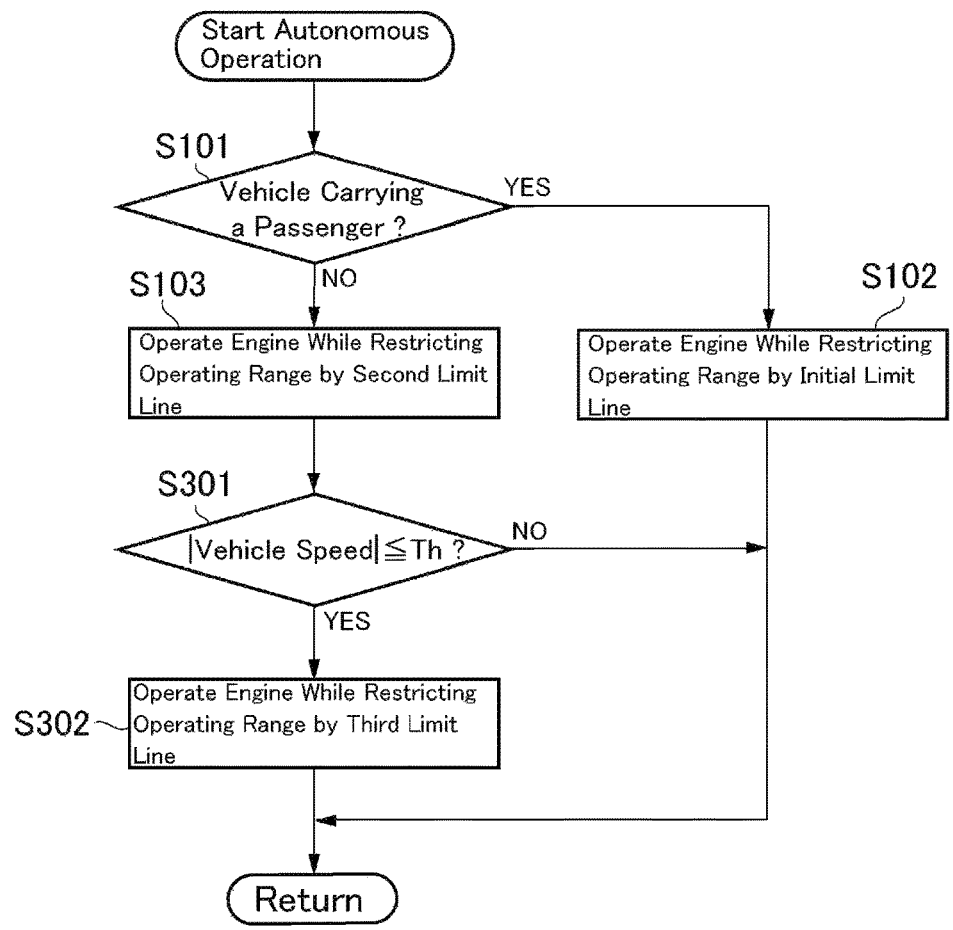
FIG. 7 is a flowchart showing a third control example carried out by the control system.

FIG. 7 shows the third control example as a modification of the first control example. According to the third control example, after shifting the limit line Lth from the first limit line Lth1 to a second limit line Lth2, the routine progresses to step S301 to determine whether or not an absolute value of a vehicle speed is equal to or lower than a threshold value Vth. If a speed of the vehicle Ve is equal to or lower than the threshold value Vth, the controller 7 determines that the vehicle Ve is propelling at an extremely low speed in any of the forward direction and backward direction, or stopping while maintaining a rotational speed at least to the self-sustaining speed. In this case, it is presumed that the noises and vibrations of the vehicle Ve is considerable. The threshold value Vth may also be set based on a result of experimentation or simulation.

If the speed of the vehicle Ve is higher than the threshold value Vth so that the answer of step S301 is NO, the routine returns without carrying out the subsequent control.

By contrast, if the speed of the vehicle Ve is equal to or lower than the threshold value Vth so that the answer of step S301 is YES, the routine progresses to step S302 to shift the limit line Lth from the second limit line Lth2 to a third limit line Lth3. As shown in FIG. 5, the third limit line Lth3 is drawn in such a manner that the lower limit value of the engine speed is higher than that of the second limit line Lth2 and the upper limit value of the engine torque is lower than that of the second limit line Lth2. Consequently, the acceptable operating region Rrpm of the operating point of the engine 1 is narrowed. That is, restriction of operation of the engine 1 is enhanced. Then, the routine returns.

Thus, in the case that the vehicle Ve is propelled autonomously without carrying a passenger, and that the speed of the vehicle Ve is lower than the threshold value Vth, the acceptable operating region Rrpm of the engine 1 is restricted by the third limit line Lth3. Consequently, the acceptable operating region Rrpm is restricted to an extent substantially identical to the case of restricting by the first limit line Lth1, or to an extent slightly wider than the case of restricting by the first limit line Lth1.

In the case that the vehicle Ve operated autonomously is thus propelled at an extremely low speed or stopped, it is expected that a passenger gets in the vehicle Ve. In addition, when the vehicle Ve is stopped, there may be some pedestrians around the vehicle Ve. According to the third control example, therefore, the acceptable operating region Rrpm of the engine 1 is restricted by the third limit line Lth3 to reduce the noises and vibrations in the situation where pedestrians are expected to be around the vehicle Ve stopping or propelling at an extremely low speed. For this reason, the noises and vibrations of the engine 1 will not bother people around the vehicle Ve.

According to the embodiments of the present disclosure, after expanding the acceptable operating region Rrpm of the engine 1 by the second limit line Lth2, an existence of pedestrians around the vehicle Ve may also be detected utilizing the external sensor 11.

Figure 8:
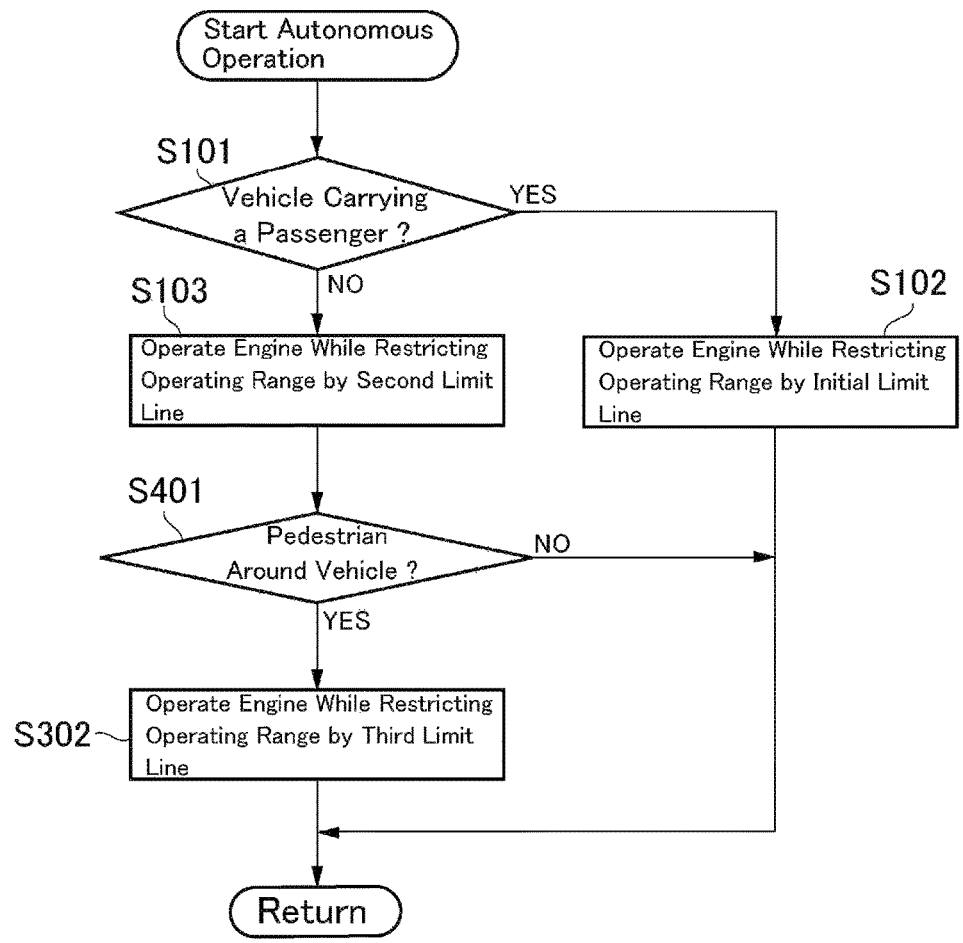
FIG. 8 is a flowchart showing a fourth control example executed by the control system.

FIG. 8 shows the fourth control example as a modification of the third control example. According to the fourth control example, after shifting the limit line Lth from the first limit line Lth1 to the second limit line Lth2, the routine progresses to step S401 to determine a presence of pedestrians within a predetermined area around the vehicle Ve based on a detection signal from the external sensor 11.

If the pedestrian around the vehicle Ve is not detected so that the answer of step S401 is NO, the routine returns without carrying out any specific control.

By contrast, if the pedestrian around the vehicle Ve is detected so that the answer of step S401 is YES, the routine progresses to step S302 to shift the limit line Lth from the second limit line Lth2 to a third limit line Lth3 thereby enhancing the restriction of operation of the engine 1. Then, the routine returns.

Thus, although the vehicle Ve is propelled autonomously without carrying the passenger, according to the fourth control example, the engine 1 is operated in such a manner as to reduce the noises and vibrations. For this reason, the noises and vibrations of the engine 1 will not bother people around the vehicle Ve.

Figure 9:
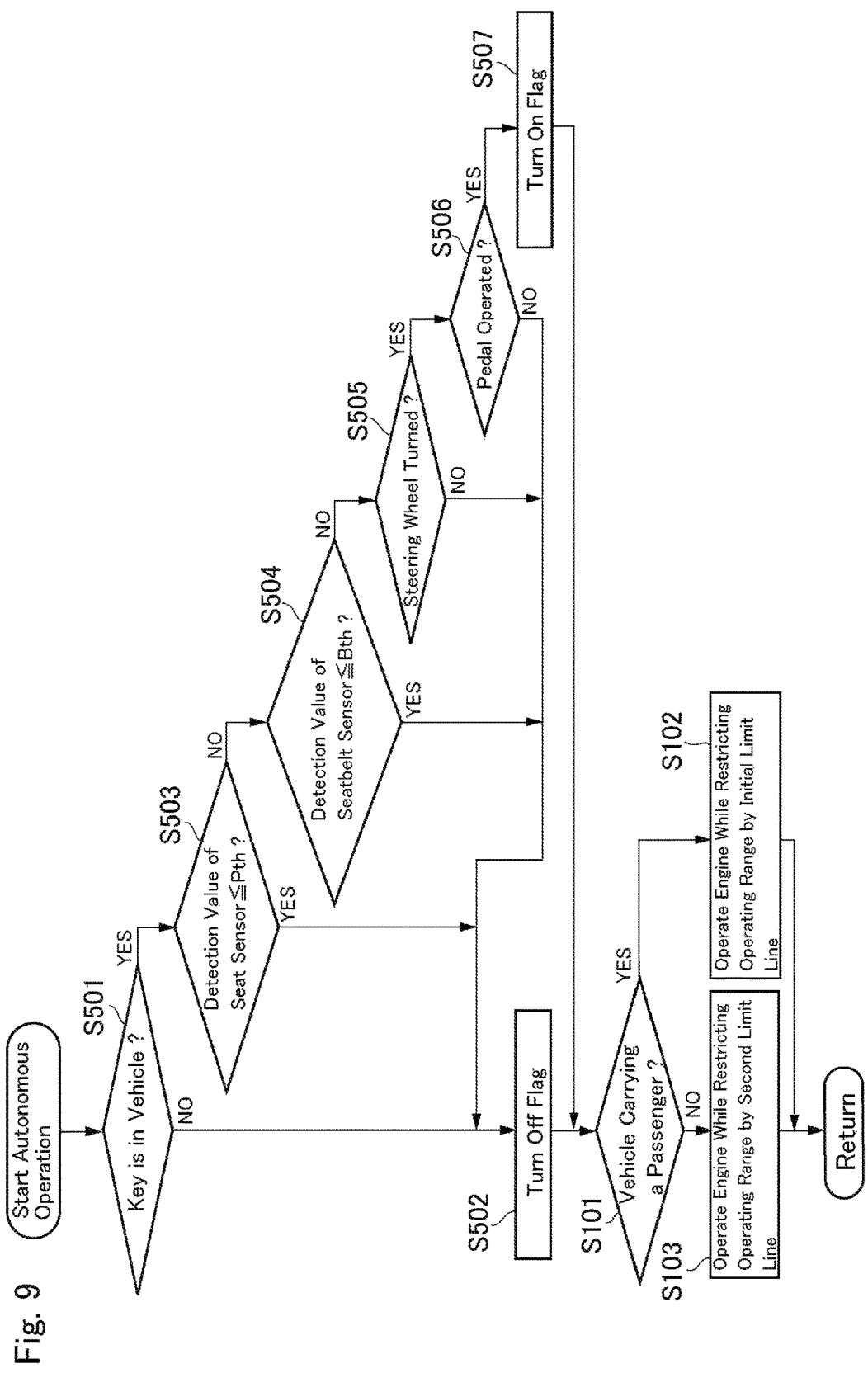
FIG. 9 is a flowchart showing a fifth control example executed by the control system.

FIG. 9 shows the fifth control example as a modification of the first control example. According to the fifth control example, a presence of the passenger in the vehicle compartment is determined based on an operation or activation of devices arranged in the vehicle compartment. For example, if the vehicle Ve is adapted to be operated only autonomously, the routine shown in FIG. 9 is commenced when starting the vehicle Ve. By contrast, if the vehicle Ve is adapted to be operated not only autonomously but also manually, the routine shown in FIG. 9 is commenced when starting the autonomous operation of the vehicle Ve.

First of all, an existence of a key of the vehicle Ve in the vehicle compartment is determined at step S501. For example, such determination at step S501 may be made based on a signal from a key switch to which the key is inserted. In this case, the controller 7 determines that the key is not in the vehicle compartment if the signal representing an insertion of the key into the key switch is not detected. Alternatively, the determination at step S501 may also be made based on a signal transmission between a remote key and a communication device arranged in the vehicle Ve. In this case, the controller 7 determines that the key is not in the vehicle compartment if the signal transmitted between the remote key and the communication device is not detected.

If the key is not in the vehicle compartment so that the answer of step S501 is NO, the routine progresses to step S502 to make a determination that there is no passenger in the vehicle compartment. At step S502, specifically a flag representing a presence of a passenger in the vehicle compartment is turned off. Then, the routine progresses to step S101.

By contrast, if the key is in the vehicle compartment so that the answer of step S501 is YES, the routine progresses to step S502 to determine whether or not all of the vehicle seats are empty. At step S501, specifically, it is determined whether or not all of detection values of the seat sensors are equal to or smaller than a threshold value Pth that is set to a maximum value of the detection value of a case in which an occupant does not sit on the vehicle seat.

If all of the detection values of the seat sensor are equal to or smaller than the threshold value Pth, that is, if all of the vehicle seats are empty so that the answer of step S503 is YES, the routine also progresses to step S502 to make a determination that there is no passenger in the vehicle compartment. Then, the routine also progresses to step S101.

By contrast, if at least one of the detection values of the seat sensor is greater than the threshold value Pth, that is, if a presence of the passenger in the vehicle compartment is detected so that the answer of step S503 is NO, the routine progresses to step S504 to determine whether or not all of seatbelts are not fastened. At step S504, specifically, it is determined whether or not all of detection values of the seatbelt sensors are equal to or smaller than a threshold value Bth that is set to a maximum value of the detection value of a case in which the seatbelt is not fastened.

If all of the detection values of the seatbelt sensor are equal to or smaller than the threshold value Bth, that is, if all of the seatbelts are not fastened so that the answer of step S504 is YES, the routine also progresses to step S502 to make a determination that there is no passenger in the vehicle compartment. Then, the routine also progresses to step S101.

By contrast, if at least one of the detection values of the seatbelt sensor is greater than the threshold value Bth, that is, if at least one of the seatbelts is fastened so that the answer of step S504 is NO, the routine progresses to step S505 to determine whether or not the steering wheel is turned. At step S505, specifically, it is determined whether or not a detection value of the steering sensor has not been changed for more than a predetermined period of time.

If the detection value of the steering sensor has not been changed for more than the predetermined period of time, that is, if the steering wheel is not turned so that the answer of step S505 is NO, the routine also progresses to step S502 to make a determination that there is no passenger in the vehicle compartment. Then, the routine also progresses to step S101.

By contrast, if the detection value of the steering sensor has not been changed, that is if the steering wheel is turned so that the answer of step S505 is YES, the routine progresses to step S506 to determine whether or not the accelerator pedal and the brake pedal are operated. At step S506, specifically, it is determined whether or not detection values of the accelerator sensor and the brake sensor have not been changed for more than a predetermined period of time.

If the detection values of the accelerator sensor and the brake sensor have not been changed for more than the predetermined period of time, that is, if the accelerator pedal and the brake pedal are not operated so that the answer of step S506 is NO, the routine also progresses to step S502 to make a determination that there is no passenger in the vehicle compartment. Then, the routine also progresses to step S101.

By contrast, if the detection value of the steering sensor has not been changed for more than the predetermined period of time, that is if the steering wheel is turned so that the answer of step S506 is YES, the routine progresses to step S507 to make a determination that there is a passenger in the vehicle compartment. At step S507, specifically the flag representing a presence of a passenger in the vehicle compartment is turned on. Then, the routine progresses to step S101.

In the routine shown in FIG. 9, if the answer of at least one of steps S501, S505 and S506 is YES, or if the answer of at least one of steps S503 and S504 is NO, the routine may also progress directly to step S507. In addition, any of steps S501 to S506 may be omitted if it is unnecessary That is, the determination of a presence of the passenger in the vehicle compartment may be made based on the answer of at least one of steps S501 to S506.

After turning off the flag representing a presence of a passenger at step S502, the routine progresses to the foregoing steps S101 and S103 or S102, and then returns.

Thus, according to the fifth control example shown in FIG. 9, a presence of the passenger in the vehicle compartment may be determined easily based on an operation or activation of the existing devices arranged in the vehicle compartment.

Figure 10:
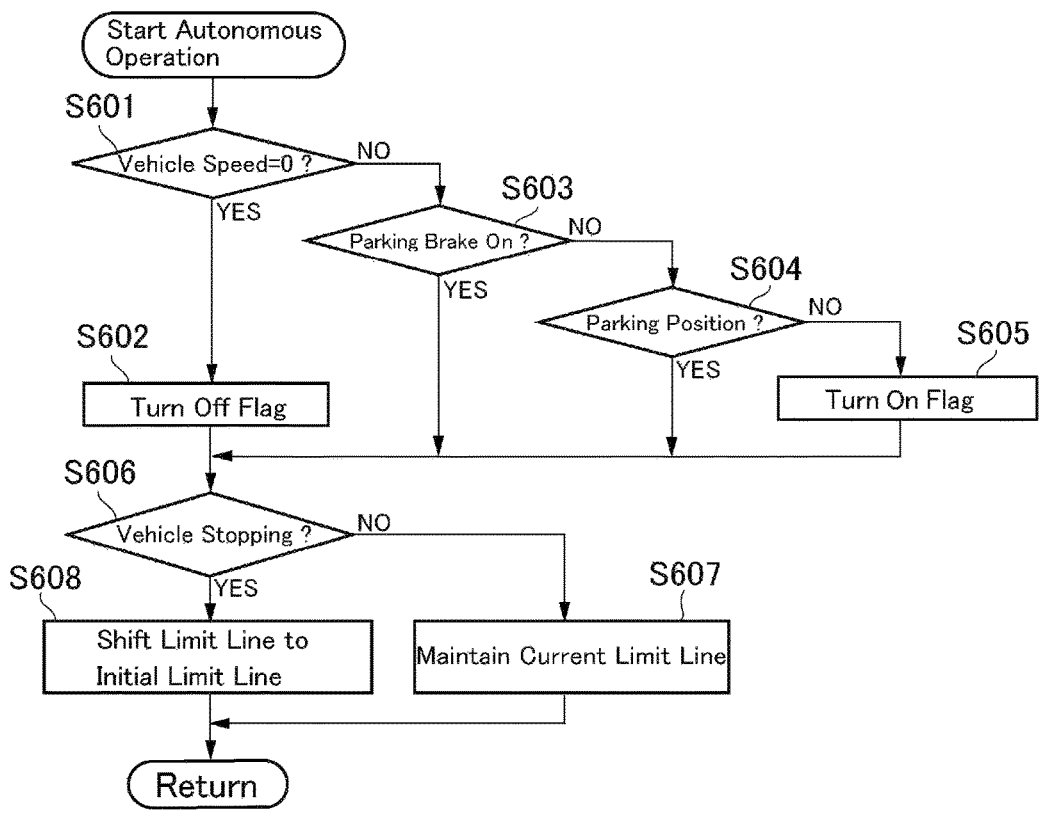
FIG. 10 is a flowchart showing a sixth control example executed by the control system.

FIG. 10 shows the sixth control example as a modification of the first control example in which the current limit line Lth for restricting the acceptable operating region Rrpm of the operating point of the engine 1 is shifted when the vehicle Ve is stopping.

First of all, it is determined at step S601 whether or not a vehicle speed is zero. For example, such determination at step S601 may be made based on a detection value of the vehicle speed sensor. If the vehicle speed is zero so that the answer of step S601 is YES, the controller 7 determines that the vehicle Ve is stopping. In this case, the routine progresses to step S602 to turn off a flag representing propulsion of the vehicle Ve.

By contrast, if the vehicle speed is not zero so that the answer of step S601 is NO, the routine progresses to step S603 to determine whether or not a parking brake is actuated. For example, such determination at step S603 may be made based on a signal from a parking brake switch or a parking brake sensor.

If the parking brake is actuated so that the answer of step S603 is YES, the routine progresses to step S602 to turn off a flag representing propulsion of the vehicle Ve.

By contrast, if the parking brake is not actuated so that the answer of step S603 is YES, the routine progresses to step S604 to determine whether or not a shift position is in a parking position. For example, such determination at step S604 may be made based on a signal from a shift lever or a shift switch.

If the shift position is in the parking position so that the answer of step S604 is YES, the routine progresses to step S602 to turn off a flag representing propulsion of the vehicle Ve.

By contrast, if the shift position is not in the parking position so that the answer of step S604 is NO, the routine progresses to step S605 to turn on the flag representing propulsion of the vehicle Ve. That is, the controller 7 determines that the vehicle Ve is running.

After turning off the flag representing propulsion of the vehicle Ve at step S602, or after turning on the flag representing propulsion of the vehicle Ve at step S605, the routine progresses to step S606 to determine whether or not the vehicle Ve is stopping based on the flag representing propulsion of the vehicle Ve.

If the vehicle Ve is running so that the answer of step S606 is NO, the routine progresses to step S607 to maintain the current limit line Lth for restricting the acceptable operating region Rrpm of the operating point of the engine 1. For example, if the vehicle Ve is currently propelled autonomously without carrying a passenger, the limit line Lth is maintained to the second limit line Lth2. Then, the routine returns.

By contrast, if the vehicle Ve is stopping so that the answer of step S606 is YES, the routine progresses to step S608 to shift the limit line Lth to the first limit line Lth1. Then, the routine returns.

Thus, according to the sixth control example, if the vehicle Ve is stopped during autonomous propulsion, the limit line Lth is shifted to the first limit line Lth1. As described, the first limit line Lth1 is the initial line that is set when starting the autonomous operation of the vehicle Ve and when carrying a passenger to reduce the noises and vibrations of the engine 1. According to the sixth control example, in the case that the vehicle Ve is propelled autonomously, the limit line Lth is maintained to the second limit line Lth2 to operate the engine 1 in an optimally fuel efficient manner.

By contrast, in the case that the vehicle Ve is thus stopping, the limit line Lth is shifted to the first limit line Lth1 so that the engine 1 may be operated in such a manner as to reduce the noises and vibrations of the engine 1. In this case, therefore, the noises and vibrations of the stopping vehicle Ve will not bother pedestrians around the vehicle Ve.

The control system according to the embodiments of the present disclosure may also be applied to the hybrid vehicles shown in FIGS. 11 to 18. In FIGS. 11 to 18, common reference numerals are allotted to the elements in common with those in FIG. 1, and detailed explanations for the common elements will be omitted in the following explanations.

Figure 11:
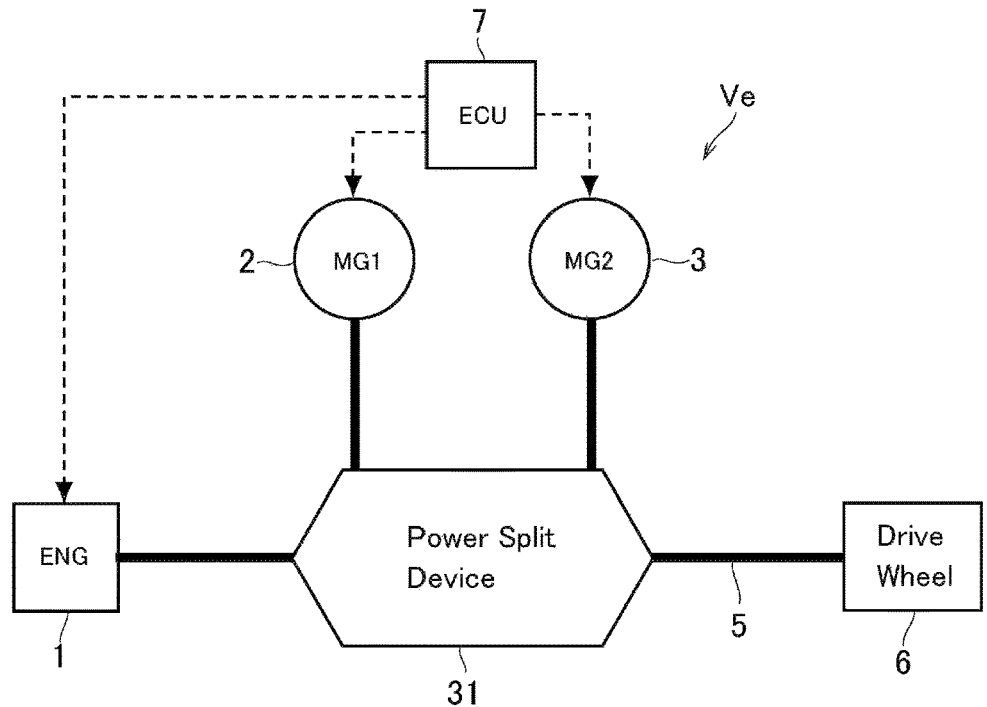
FIG. 11 is a schematic illustration showing a second example of the drive system of the vehicle to which the control system is applied.

FIG. 11 shows the second example of the drive system of the vehicle Ve. As the vehicle Ve shown in FIG. 1, the prime mover of the vehicle Ve shown in FIG. 9 also includes the engine, the first motor 2 and the second motor 3, and the vehicle Ve shown in FIG. 9 also comprises the power split device 4, the output member 5, the drive wheels 6, and the controller 7. In the power split device 4 of the vehicle Ve shown in FIG. 1, the input element is connected to the engine 1, the reaction element is connected to the first motor 2, and the output element is connected to the drive wheels 6 through the output member 5. That is, the vehicle Ve shown in FIG. 1 is an input split type hybrid vehicle. By contrast, in the power split device 4 of the vehicle Ve shown in FIG. 9, the input element is connected to the engine 1 and the second motor 3, the reaction element is connected to the first motor 2, and the output element is connected to the output member 5. That is, the vehicle Ve shown in FIG. 9 is an output split type hybrid vehicle.

Figure 12:
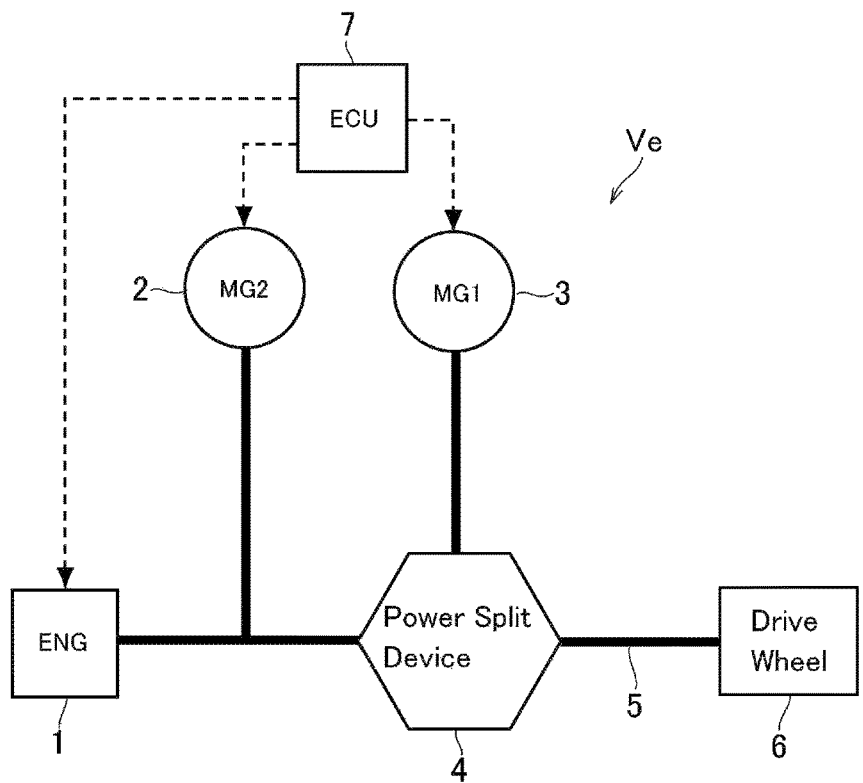
FIG. 12 is a schematic illustration showing a third example of the drive system of the vehicle to which the control system is applied.

FIG. 12 shows the third example of the drive system of the vehicle Ve as a complex split type hybrid vehicle. As the vehicle Ve shown in FIG. 1, the prime mover of the vehicle Ve shown in FIG. 12 also includes the engine 1, the first motor 2 and the second motor 3, and the vehicle Ve shown in FIG. 12 comprises a power split device 31, the output member 5, the drive wheels 6, and the controller 7. The power split device 31 is a complex planetary gear unit having four rotary elements that is formed by combining two planetary gear units. In the power split device 31, an input element is connected to the engine 1, an output element is connected to the drive wheels 6 through the output member 5, and remaining rotary elements are individually connected to the first motor 2 and the second motor 3. The power split device 31 is provided with engagement elements such as a clutch for switching a connection among the rotary elements and a brake for selectively stopping a rotation of the rotary element (neither of which are shown). That is, the power split device 31 may also be used as a transmission for changing a speed between the input element and the output element by manipulating the engagement elements.

Figure 13:
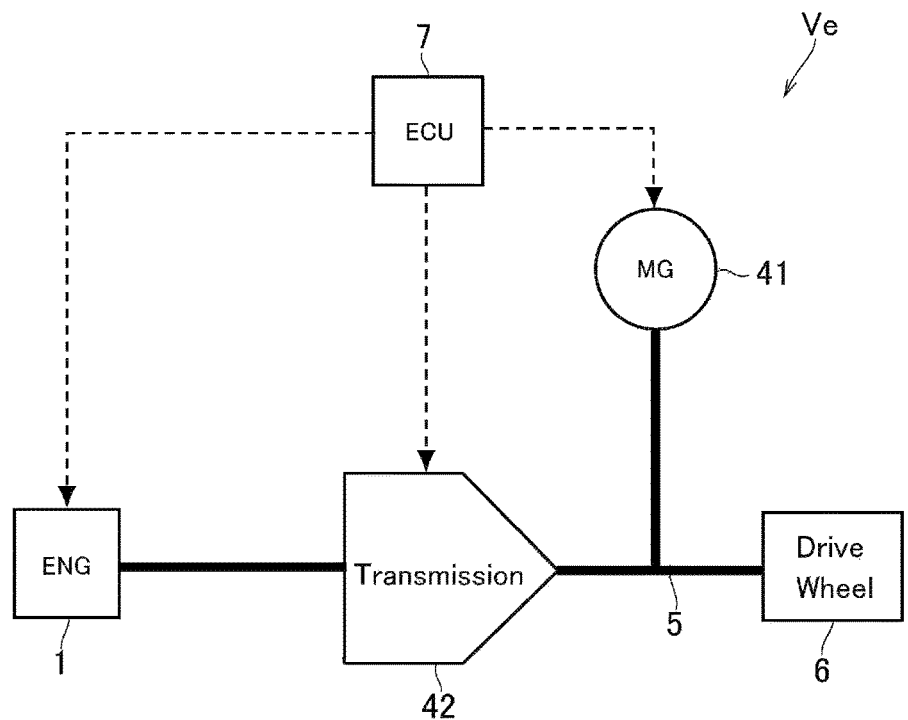
FIG. 13 is a schematic illustration showing a fourth example of the drive system of the vehicle to which the control system is applied.
Figure 14:
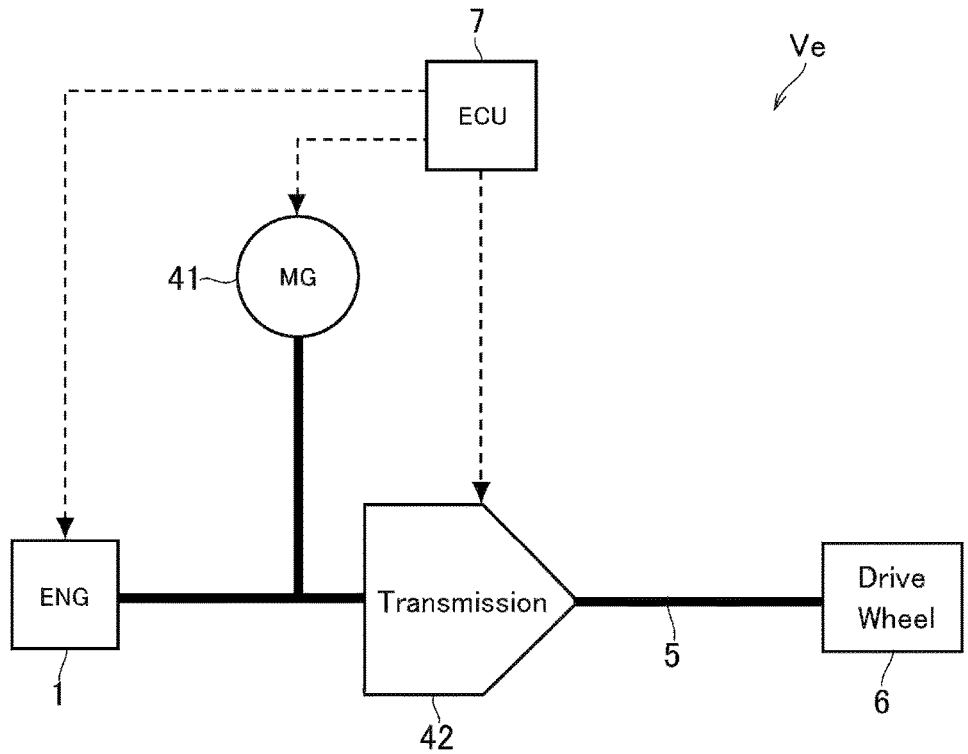
FIG. 14 is a schematic illustration showing a fifth example of the drive system of the vehicle to which the control system is applied.
Figure 15:
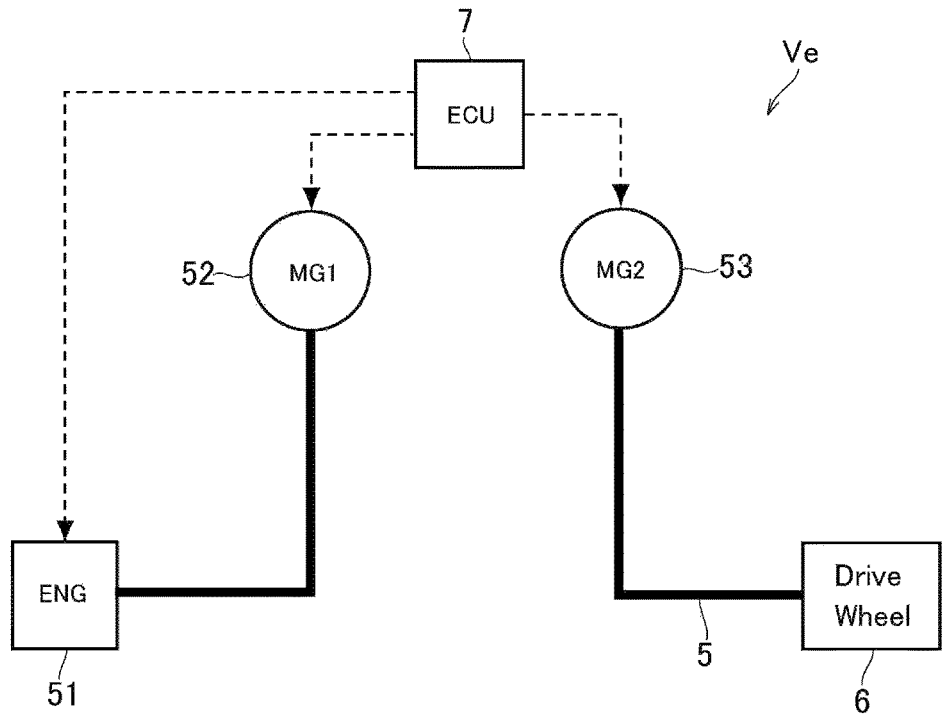
FIG. 15 is a schematic illustration showing a sixth example of the drive system of the vehicle to which the control system is applied.

FIGS. 13, 14 and 15 individually show the fourth to sixth examples of the vehicle Ve as a parallel hybrid type hybrid vehicle. In the hybrid vehicles Ve shown in FIGS. 13 to 15, each prime mover individually includes the engine 1 and a motor 41 (referred to as in "MG" FIG. 1), and each of the hybrid vehicles Ve individually comprises a transmission 42, the output member 5, the drive wheels 6 and the controller 7. As the first motor 2 and the second motor 3, a motor-generator may also be used as the motor 41. Specifically, the transmission 42 is an automatic transmission adapted to change a speed ratio thereof continuously. In the hybrid vehicle Ve shown in FIG. 13, the engine 1 is connected to an input side of the transmission 42, and the motor 41 is connected to an output side of the transmission 42 through the output member 5. In the hybrid vehicles Ve shown in FIGS. 14 and 15, the engine 1 and the motor 41 are connected to the input side of the transmission 42, and the drive wheels 6 are connected to the output side of the transmission 42 through the output member 5. In the hybrid vehicle Ve shown in FIG. 15, a clutch 43 is disposed between the engine 1 and the transmission 42.

Figure 16:
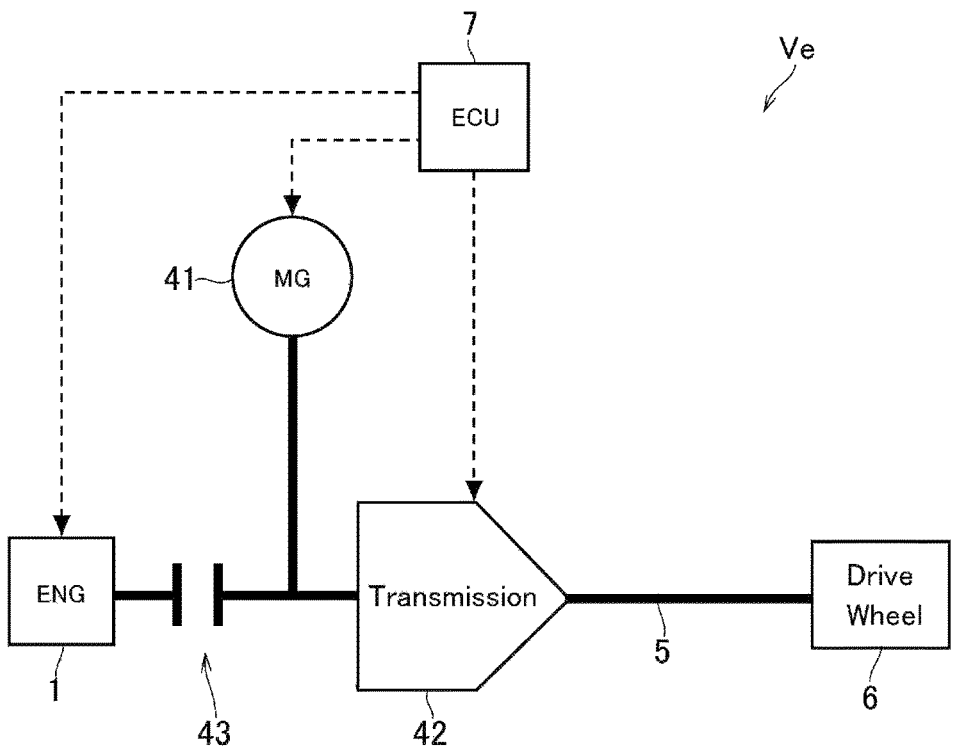
FIG. 16 is a schematic illustration showing a seventh example of the drive system of the vehicle to which the control system is applied.

FIG. 16 shows the seventh example of the drive system of the vehicle Ve as a series hybrid type hybrid vehicle. The prime mover of the vehicle Ve shown in FIG. 14 includes an engine (referred to as "ENG" in FIG. 14) 51, a first motor (referred to as "MG1" in FIG. 14) 52 and a second motor (referred to as "MG2" in FIG. 14) 53, and the vehicle Ve shown in FIG. 16 comprises the output member 5, the drive wheels 6, and the controller 7. An internal combustion engine such as a gasoline engine and a diesel engine may also be used as the engine 51, and a motor-generator may also be used as the first motor 52 and the second motor 53. However, a generator may also be used as the first motor 52. In the vehicle Ve shown in FIG. 16, the engine 51 is connected to the first motor 52, and the second motor 53 is connected to the drive wheels 6 through the output member 5. In addition, the first motor 52 and the second motor 53 are electrically connected to each other through a battery, an inverter, or a converter (neither of which are shown) so that thee second motor can be driven by supplying an electricity generated by the first motor 52.

Figure 17:
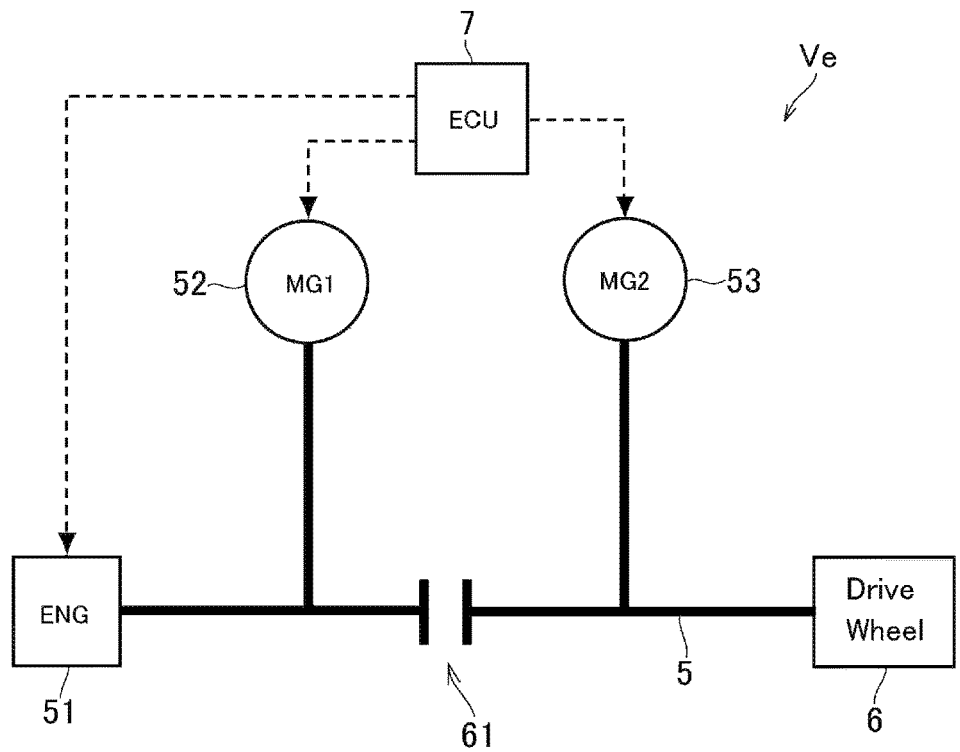
FIG. 17 is a schematic illustration showing an eighth example of the drive system of the vehicle to which the control system is applied.

FIG. 17 shows the eighth example of the drive system of the vehicle Ve as a parallel hybrid type hybrid vehicle. As the vehicle Ve shown in FIG. 16, the prime mover of the vehicle Ve shown in FIG. 15 also includes the engine 51, the first motor 52 and the second motor 53, and the vehicle Ve shown in FIG. 17 also comprises the output member 5, the drive wheels 6, and the controller 7. In addition, a clutch 61 is disposed between the engine 51 and the output member 5 to selectively provide a connection therebetween. Specifically, when the clutch 61 is disengaged, the hybrid vehicle Ve serves as the series hybrid type hybrid vehicle. By contrast, when the clutch 61 is engaged, the hybrid vehicle Ve serves as the parallel hybrid type hybrid vehicle.

Figure 18:
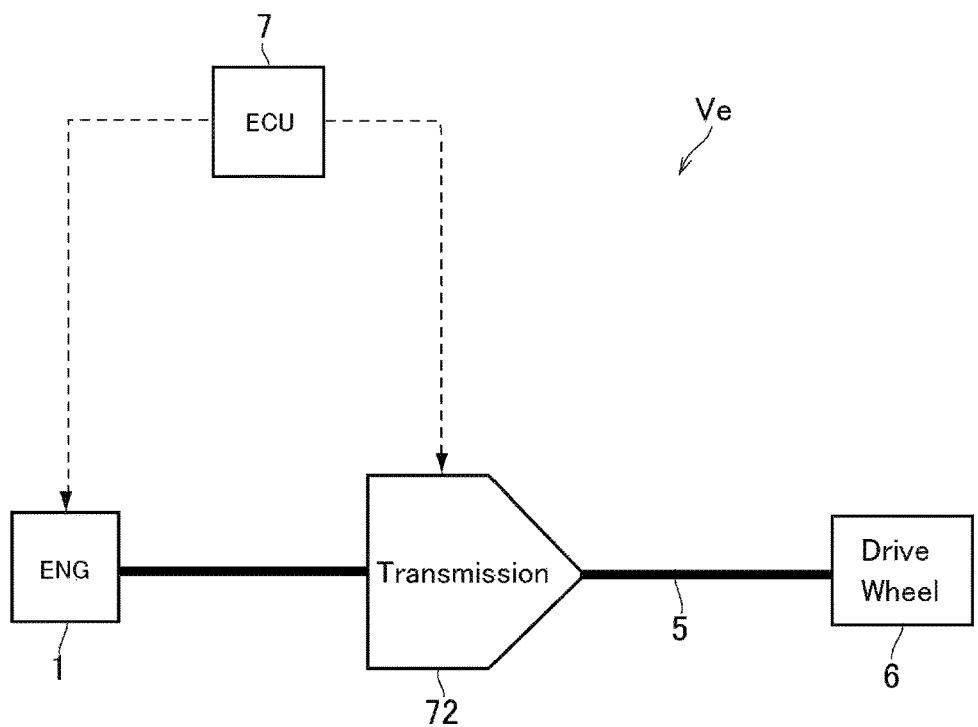
FIG. 18 is a schematic illustration showing a ninth example of the drive system of the vehicle to which the control system is applied.

FIG. 18 shows the ninth example of the drive system of the vehicle Ve in which only an internal combustion engine 71 serves as a prime mover. The vehicle Ve shown in FIG. 18 comprises a transmission 72, the output member 5, the drive wheels 6, and the controller 7. The transmission 72 is also an automatic transmission adapted to change a speed ratio thereof continuously. In the vehicle Ve shown in FIG. 18, the engine 71 is connected to an input side of the transmission 72, and the drive wheels 6 are connected to an output side of the transmission 72 through the output member 5. The control system according to the embodiments of the present disclosure may also be applied to the conventional vehicle shown in FIG. 18 other than the hybrid vehicle.

Although the above exemplary embodiments of the present application have been described, it will be understood by those skilled in the art that the present application should not be limited to the described exemplary embodiments, and various changes and modifications can be made within the spirit and scope of the present application.

What is claimed is:

1. A vehicle control system that is configured to autonomously operate a vehicle powered at least by an engine and a motor, comprising:
    a controller that is configured to control the vehicle, wherein
    the motor serves as a prime mover, and
    the controller is configured to:
    set a limit value of an operating point of the engine to reduce noises and vibrations of the engine;
    restrict the operating point of the engine by the limit value, within an acceptable region where an engine speed is higher than the limit value but an engine torque is lower than the limit value;
    determine a presence of a passenger in a vehicle compartment;
    set the limit value to a first limit value in a case that the vehicle is operated autonomously while carrying the passenger;
    set the limit value to a second limit value such that the acceptable region of the operating point of the engine is wider than that in the first limit value in a case that the vehicle is operated autonomously without carrying the passenger; and
    generate torque with the motor to reduce noise generated by a transmission connected to the motor when the limit value is set to the second limit value.

2. The vehicle control system as claimed in claim 1, wherein the vehicle comprises a sensor that detects a vehicle speed, and wherein the controller is further configured to shift the limit value from the second limit value to a third limit value to narrow the acceptable region of the operating point of the engine in a case that the vehicle speed is equal to or lower than a threshold value.

3. The vehicle control system as claimed in claim 1, wherein the vehicle comprises a sensor that detects a pedestrian around the vehicle, and wherein the controller is further configured to shift the limit value from the second limit value to a third limit value to narrow the acceptable region of the operating point of the engine in a direction to increase the engine speed and reduce the engine torque in a case that the pedestrian is detected by the sensor within a predetermined area around the vehicle.

4. The vehicle control system as claimed in claim 1, wherein the vehicle comprises a device that is arranged in the vehicle compartment, and wherein the controller is further configured to determine a presence of the passenger based on at least any one of an operating state and an activating state of the device.

5. The vehicle control system as claimed in claim 1, wherein the controller is further configured to:

determine that the vehicle is stopping; and set the limit value to the first limit value in a case that the vehicle is stopping.

\* \* \* \* \*